Oct. 6, 1931.   W. OWEN   1,825,886
MACHINE FOR SEVERING COMPOSITE GLASS SHEETS AND THE LIKE
Filed Dec. 22, 1928   4 Sheets-Sheet 3

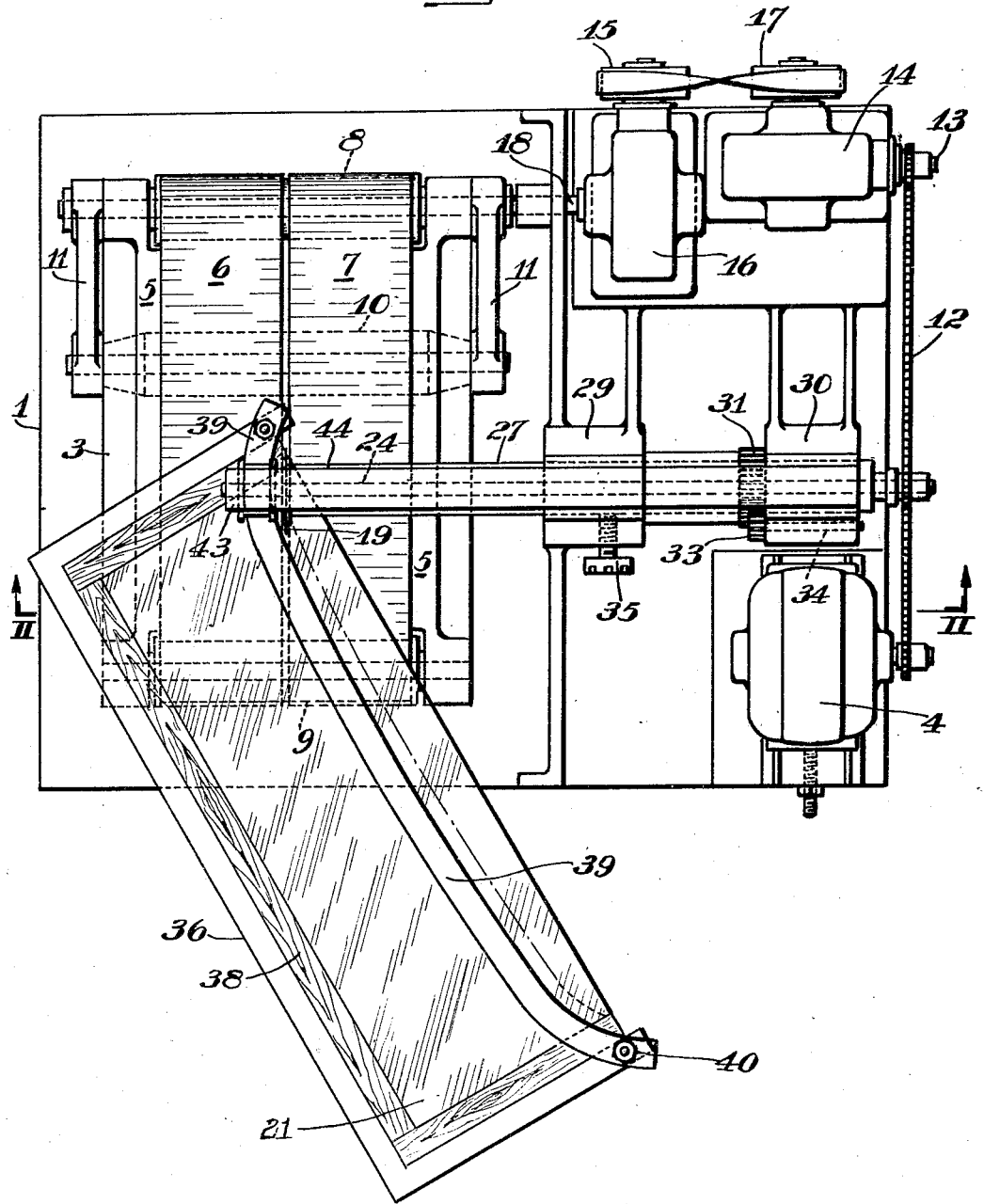

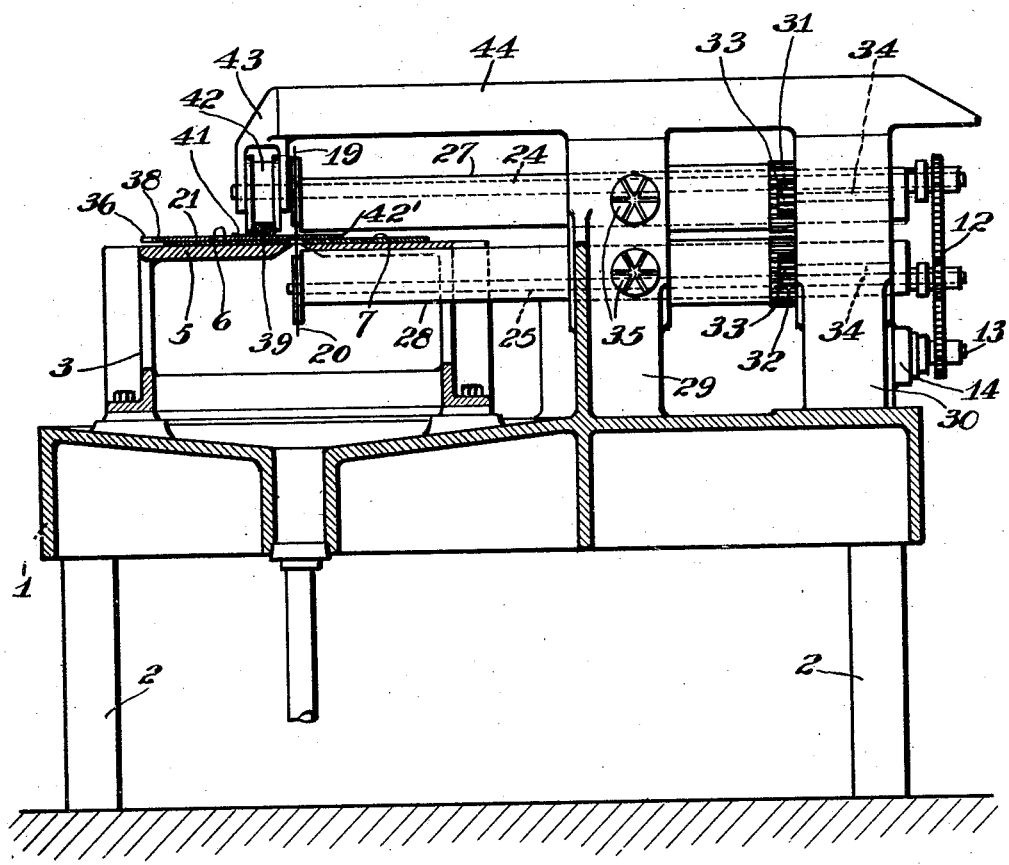

INVENTOR
Wm Owen
by
James C Bradley
atty.

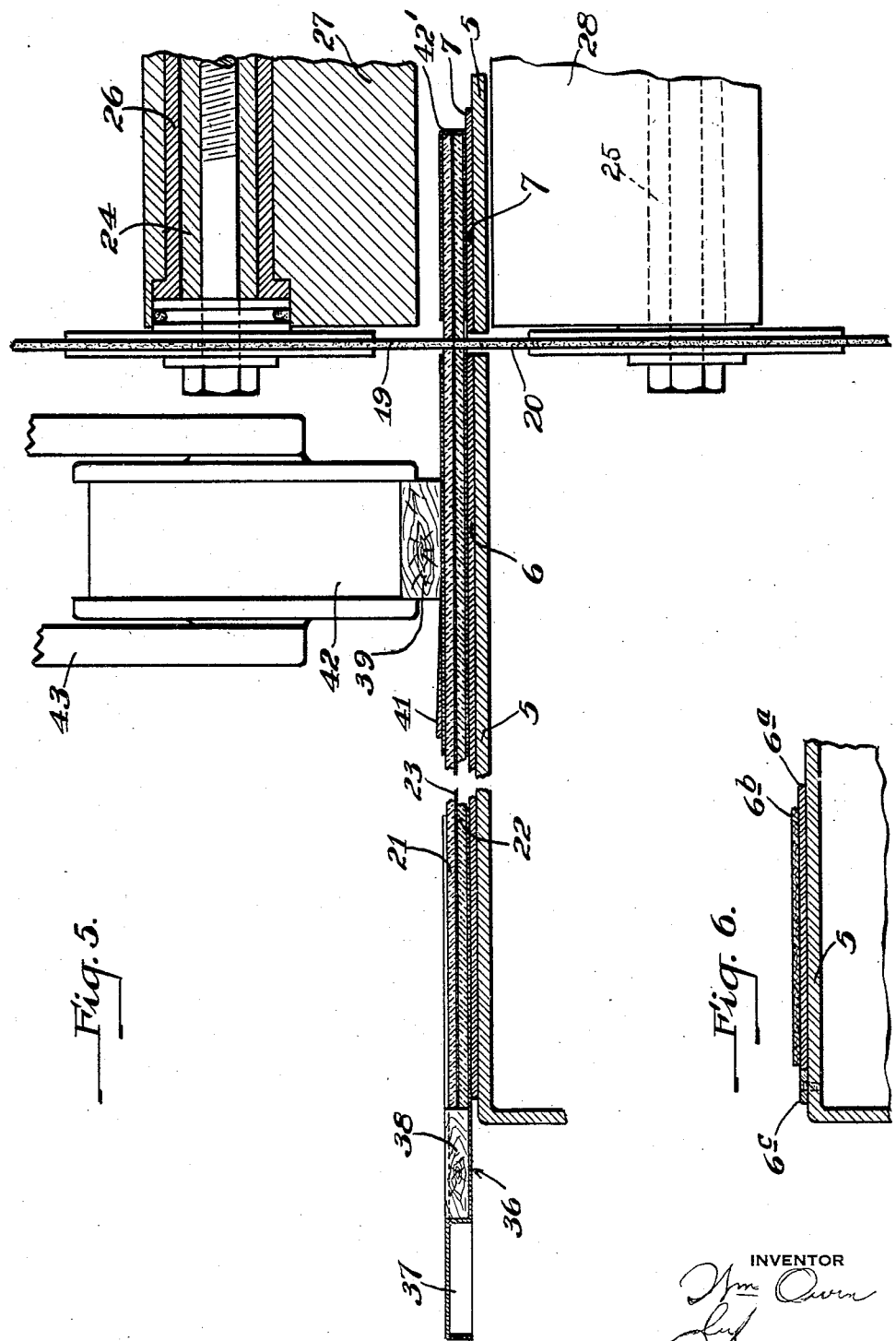

Patented Oct. 6, 1931

1,825,886

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

MACHINE FOR SEVERING COMPOSITE GLASS SHEETS AND THE LIKE

Application filed December 22, 1928. Serial No. 328,018.

Figure 4:
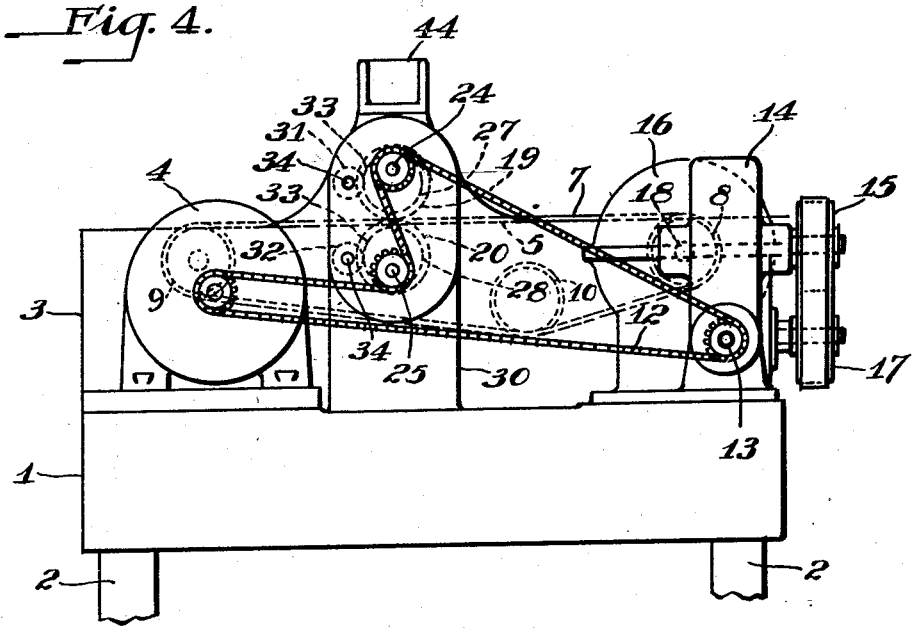
Figure 3:
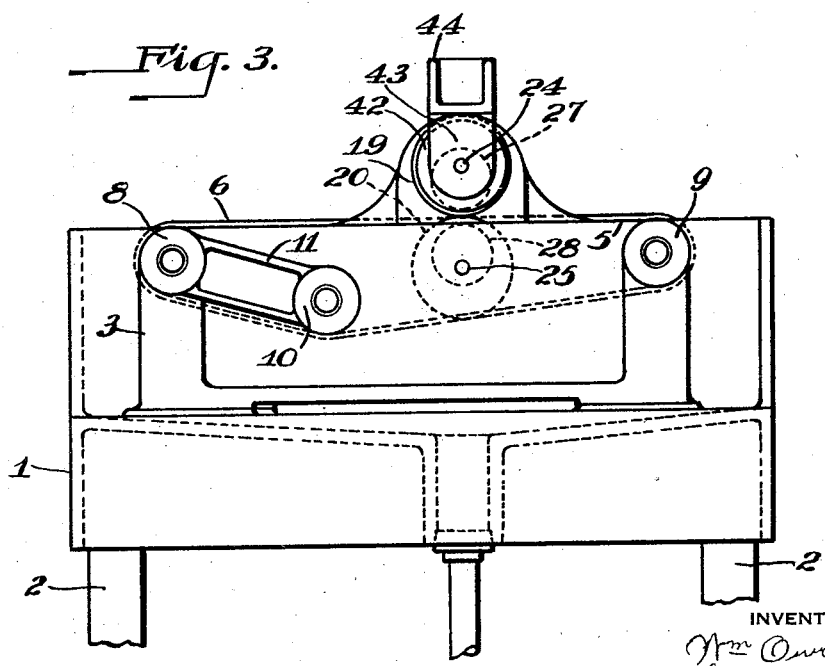

The invention relates to apparatus for severing sheets of composite glass and the like, and more particularly in cases where it is necessary to cut the sheets on a curve, such as is the case with the lower edge of the ordinary windshield. The curvature required is ordinarily irregular, the radius of curvature for the major portion of the cut being relatively large, while that for the ends of the cut is much shorter, and the object of the present invention is to provide a simple, easily operated machine for cutting curves of the character specified. Further objects are the provision of a machine which will cut the desired curves accurately, which requires no particular skill to operate, and in which the glass is properly supported on both sides of the cut so that breakage incident to vibration is reduced to a minimum. One embodiment of the invention is illustrated in the accompanying drawings, wherein:

Figure 1 is a plan view of the machine. Fig. 2 is a section on the line II—II of Fig. 1. Figs. 3 and 4 are end elevations. Fig. 5 is an enlarged detail section. And Fig. 6 shows a detail modification.

Referring to the drawings 1 is the framework of the machine in the form of a casting provided with legs 2 and carrying at one end the belt table 3 and at its other end the electric motor 4. The belt table comprises a top plate 5, and carries a pair of endless belts 6 and 7. The upper horizontal flights of the two belts are supported on the top plate 5, so that they will not sag in carrying the work past the cutting discs, as later described, and pass around the pulleys 8 and 9. A roller 10 (Figs. 1 and 3) carried by the swinging arms 11, 11 rests upon the lower flights of the belts and acts as a take-up means or tightener. The pulley 8 is driven from the motor 4, a roller chain 12 passing around sprockets on the motor shaft and on the shaft 13 of the speed reducer 14. The pulley 15 of a second speed reducer 16 is driven from the pulley 17 of the first reducer, and the shaft 18 of the second speed reducer drives the belt pulley 8.

The cutting of the composite glass sheet which the machine is particularly designed to handle is accomplished by a pair of thin disc wheels 19 and 20, arranged in substantially vertical alinement, one above the other, as shown in Figs. 2 and 5. The composite sheet to be cut ordinarily comprises a pair of glass sheets 21 and 22 (Fig. 5) with an interposed layer or sheet 23 of pyroxylin plastic; and the discs are adjusted so that their peripheries just clear each other, so that after the cutting is completed a thin film of the plastic still remains unsevered. The shafts 24 and 25 which carry the discs are mounted in the bushings 26 which are in turn carried by the tubular members 27 and 28. The tubular members are themselves mounted in the standards 29 and 30 projecting upward from the frame 1. The shafts 24 and 25 are mounted eccentrically in the members 27 and 28 (Fig. 4) so that by adjusting such members around their axes, the shafts 24 and 25 and the cutting discs may be adjusted toward each other, this adjustment being necessary from time to time to compensate for the wearing away of the wheels.

To facilitate the rotary adjustment of the members 27 and 28 they are provided with spur gears 31 and 32 (Figs. 1, 2 and 3), and these gears are engaged by pinions 33, 33 on the shafts 34, 34, which shafts have their ends squared so that they may be engaged by a suitable key or wrench. The members are secured in their positions of rotary adjustment by the clamping bolts 35, 35. The shafts 24 and 25 carrying the thin cutting discs are driven at a high rate of speed from the drive chain 12 of the motor 4, such chain passing around sprockets on the ends of the shafts, as indicated in Fig. 4.

The composite glass sheet to be cut is preferably carried in a sheet metal pan 36 having an upstanding rim 37 on three sides. These sides prevent edgewise movement of the sheet in the pan, wood strips 38 serving to fill the spaces between the edge of the glass and the rim 37 when the composite sheet is of a size which does not exactly fit the tray. A template bar or cam 39 extends from one end of the tray to the other, being clamped releasably to the edges 37 of the tray by bolts 40 or other suitable means. This bar corresponds in contour with the curve to be cut in the composite plate. This bar is utilized as a means for holding the glass tightly against the bottom of the tray by the use of wedges 41 (Fig. 5) of wood driven between the glass and the bar. This gives the glass support adjacent the line of cut and tends to prevent vibration and chipping. The edge of the tray adjacent the bar follows the contour of the bar, so as to approach closely to the edge of the glass along the line of cut and thus give a maximum degree of support at a point relatively close to the cutting discs. The strip of composite glass lying to the right of the cutting discs, which is severed from the body of the sheet in the tray, is preferably supported by a spring clip 42', which is U-shape in cross section (Fig. 5), the material of the clip being of the same thickness as the bottom of the tray. This provides for a support of the strip (which is cut off) from the belt 7 at the same level at which the body of the sheet is supported by the bottom of the tray. Any up and down vibration of the strip tending to cause it to pinch the side of the lower cutting disc 20 is avoided.

The template bar 39 is engaged by the guide roller 42 whose flanges engage the opposite sides of the bar. This roller is carried by a bracket 43 depending from the support 44, such support being bolted to the top of the standards 29 and 30 (Fig. 2).

The use of the belts 6 and 7 is not essential, but such belts assist in feeding the tray over the table 5 and reduce the work of the operator. After the sheet to be cut is secured in the tray, the operator positions such tray as indicated in Fig. 1, with the end of the template bar in engagement with the guide roller 42, and then starts the tray inward and supports its outer end, the drag of the belts then assisting in carrying the glass between the cutting discs. If desired, the sheets of glass may be cracked by the use of a diamond preliminary to placing the sheet in the tray. This preliminary cracking speeds up the cutting operation, but is not essential to the operation, and may be dispensed with. The use of the template and guide roller insures an accurate cutting of the sheet to the desired contour, so that the edge requires only a slight amount of grinding to smooth it. Any other suitable form of template and guide therefor may be substituted for the members illustrated and described, and the shape and construction of the member 36 which carries the sheet may be modified to meet conditions, the only requirements being for a flat supporting plate and means whereby the glass is held securely against sliding movement over the plate.

While the machine is particularly designed for cutting curves, it may be used to advantage in cutting along straight lines, in which case the use of the tray and the template and roller guide means are dispensed with, and the glass laid directly upon the belts, being held against slipping on the belts by weights or any other suitable means. When the machine is used for cutting along straight lines, it is also not essential that the wheels be placed substantially in direct opposition, as this expedient is primarily useful to avoid cutting a relatively wide slot, when the line of cut is a curve, as heretofore explained, and with straight line cuts, the width of the slot cut is the same, whether the cutting discs are directly opposite or whether they are arranged in tandem. In any case, however, the adjustment of the discs is such that each cuts only a part way through the sheet.

Fig. 6 shows a modified belt construction in which the leather belts as used in the construction of Figs. 1 to 5 are provided with a layer of felt to provide a cushioning effect and reduce the vibration of the glass under the action of the cutting discs. As shown, 6a is the leather belt which rides over the table 5, and 6b is the layer of felt, the leather belt being guided at its outer edge by the metal strips 6c. This form of belt is preferably used in machines designed to cut straight lines, but may also be used in the machines for cutting curves as illustrated in Figs. 1 to 5.

What I claim is:

1. In combination, a machine for cutting curves in sheets of hard material, comprising a thin driven cutting disc, a supporting table, a tray for carrying the sheet to be cut over the table having upturned edges and provided with a template corresponding in contour to the curve to be cut, means between said upturned edges and the edges of the sheet for holding it against movement in the tray and a guide member mounted in fixed relation with respect to the axis of rotation of the disc and adapted to engage said template and guide the tray and the sheet carried thereby over the table and beneath the disc.

2. In combination, a machine for cutting curves in sheets of hard material, comprising a thin driven cutting disc, a supporting table, a tray for carrying the sheet to be cut over the table having upturned edges and provided with a template in the form of a curved bar corresponding in contour to the curve to be cut, filler means between the edges of the sheet and said upturned edges of the tray and a guide member provided with a pair of flanges mounted in fixed relation with respect to the axis of rotation of the disc and adapted to fit over said template bar with a flange on each side thereof and to guide the tray and the sheet carried thereby over the table beneath the disc.

3. In combination, a machine for cutting curves in sheets of hard material, comprising a thin driven cutting disc, a supporting table, a tray for carrying the sheet to be cut over the table having a depth approximately equal to the thickness of the sheet and provided with a template lying over the sheet and holding it down, means preventing lateral movement of the sheet in the tray, and a flanged guide roller mounted with its axis of rotation in fixed relation with respect to the axis of rotation of the disc, and adapted to fit over said template bar and guide the tray and sheet carried thereby over the table beneath the disc.

4. In combination, a machine for cutting curves in sheets of hard material, comprising a thin driven cutting disc, a supporting table, a pair of driven belts, one on each side of the disc mounted for movement over the table past the disc, a tray carrying the sheet to be cut mounted on said belts and having a depth approximately equal to the thickness of the sheet, and provided with a template lying over the sheet and holding it down corresponding in contour to the curve to be cut, means for preventing lateral movement of the sheet in the tray, and a guide member mounted in fixed relation with respect to the axis of rotation of the disc and adapted to engage said template and guide the tray and the sheet carried thereby over the table and beneath the disc.

5. In combination, a machine for cutting curves in sheets of hard material, comprising a pair of thin driven cutting discs in opposition, one above the other, a supporting table at the sides of the discs, a thin flat plate for carrying the sheet to be cut over the table, a template rigid with the plate and having a contour corresponding to that of the curve to be cut, means between the template and the sheet for clamping the sheet against the plate and a guide member mounted in fixed relation with respect to the axes of rotation of the discs and adapted to engage said template and to guide the tray and the sheet carried thereby over the table between the discs.

6. In combination, a machine for cutting curves in sheets of hard material, comprising a thin driven cutting disc, a supporting table, a tray for carrying the sheet to be cut over the table, a template in the form of a bar lying over the sheet in the tray adjacent the edge of such sheet and secured at its ends to the edges of the tray, said template corresponding in contour to that of the curve to be cut, means supported by the template bar for clamping the glass against the bottom of the tray, and a guide member mounted in fixed relation with respect to the axes of rotation of the discs, and adapted to engage the template and guide the tray and the sheet carried thereby over the table and beneath the disc.

7. In combination, a machine for cutting curves in sheets of hard material, comprising a thin driven cutting disc, a supporting table, a tray for carrying the sheet to be cut over the table, a template in the form of a bar lying over the sheet in the tray adjacent the edge of such sheet and secured at its ends to the edges of the tray, said template corresponding in contour to that of the curve to be cut, wedging means between the bar and the glass, and a guide member mounted in fixed relation with respect to the axes of rotation of the disc, and adapted to engage the template and guide the tray and the sheet carried thereby over the table and beneath the disc.

8. In combination, a machine for cutting curves in sheets of hard material, comprising a thin driven cutting disc, a supporting table, a tray for carrying the sheet to be cut over the table, a template in the form of a bar lying over the sheet in the tray adjacent the edge of such sheet and secured at its ends to the edges of the tray, said template corresponding in contour to that of the curve to be cut, means supported by the template bar for clamping the glass against the bottom of the tray, a fixed frame member lying above the disc, and a guide roller mounted in said frame and engaging the template, so as to guide the tray and the sheet carried thereby over the table and beneath the disc.

In testimony whereof, I have hereunto subscribed my name this 18th day of Dec., 1928.

WILLIAM OWEN.